United States Patent
Kobayashi et al.

(10) Patent No.: US 6,195,460 B1
(45) Date of Patent: Feb. 27, 2001

(54) PATTERN EXTRACTION APPARATUS

(75) Inventors: Koji Kobayashi; Hiroshi Nakajima, both of Tokyo; Takafumi Aoki, Miyagi; Masayuki Kawamata, Miyagi; Tatsuo Higuchi, Miyagi, all of (JP)

(73) Assignee: Yamatake Corporation, Tokyo (JP)

(*) Notice: Subject to any disclaimer, the term of this patent is extended or adjusted under 35 U.S.C. 154(b) by 0 days.

(21) Appl. No.: 09/297,537

(22) PCT Filed: Nov. 1, 1996

(86) PCT No.: PCT/JP96/03212

§ 371 Date: Apr. 30, 1999

§ 102(e) Date: Apr. 30, 1999

(87) PCT Pub. No.: WO98/20454

PCT Pub. Date: May 14, 1998

(51) Int. Cl.$^7$ ...................................................... G06K 9/46
(52) U.S. Cl. .......................... 382/190; 382/210; 382/236; 382/278; 382/280; 359/559
(58) Field of Search ..................................... 382/103, 107, 382/190–191, 210, 217–219, 236, 273, 278–280; 359/559–561

(56) References Cited

U.S. PATENT DOCUMENTS

| | | | | |
|---|---|---|---|---|
| 5,619,596 | * | 4/1997 | Iwaki et al. | 382/278 |
| 5,684,890 | * | 11/1997 | Miyashita et al. | 382/154 |
| 5,886,744 | * | 3/1999 | Hannah | 375/240.16 |
| 5,910,999 | * | 6/1999 | Mukohzaka | 382/278 |
| 5,915,034 | * | 6/1999 | Nakajima et al. | 382/210 |
| 6,067,367 | * | 5/2000 | Nakajima et al. | 382/103 |

FOREIGN PATENT DOCUMENTS

| | | |
|---|---|---|
| 2-206294 | 8/1990 | (JP) . |
| 7-108526 | 4/1995 | (JP) . |
| 7-254062 | 10/1995 | (JP) . |
| 8-16785 | 1/1996 | (JP) . |
| 2700397 | 7/1977 | (NL) . |

OTHER PUBLICATIONS

"Introduction to Computer Image Processing" Japan Industrial Technology Center pp. 44–45, Jun. 1990.
"Fingerprint Identification Algorithm Using 2–D DFT" Savemation Review pp. 2–7, Feb., 1995.
"Fingerprint Identification System using Liquid Crystal Spatial Light Modulators for Phase Modulation", The Institute of Electronics, Information and Communication Engineers, Proceedings of the 1993 IEICE Fall Conference D–287, Sep. 1993.
Beyerer J: "Suppression of Stochastically placed, straight toolmarks to enhance objects and defects" vol. 59, No. 10, Oct. 1, 1992 pp. 389–397.

* cited by examiner

*Primary Examiner*—Leo Boudreau
*Assistant Examiner*—Gregory Desire
(74) *Attorney, Agent, or Firm*—Blakely Sokoloff Taylor & Zafman

(57) ABSTRACT

Collation Fourier image data (FIG. 1D) FB generated by performing the two-dimensional discrete Fourier transform (DFT) for the image data (FIG. 1C) of a collation pattern is synthesized with registration Fourier image data (FIG. 1B) generated by performing the two-dimensional DFT for the image data of a registration pattern. After amplitude suppression processing is performed for the resultant data, two-dimensional DFT is performed. A correlation peak is extracted from a correlation component area which appears in the synthesized Fourier image data (FIG. 1E) for which the two-dimensional DFT has been performed. A predetermined area including this correlation peak is then masked (FIG. 1F). The two-dimensional DFT is performed for the masked synthesized Fourier image data, and amplitude restoration processing is performed for the data. The resultant data is re-synthesized with the registration Fourier image data FA, and the two-dimensional IDFT is performed for the synthesized data. With this processing, image data containing a difference pattern like the one shown in FIG. 1G or a moving pattern can be obtained.

8 Claims, 9 Drawing Sheets

FA

FB

SO

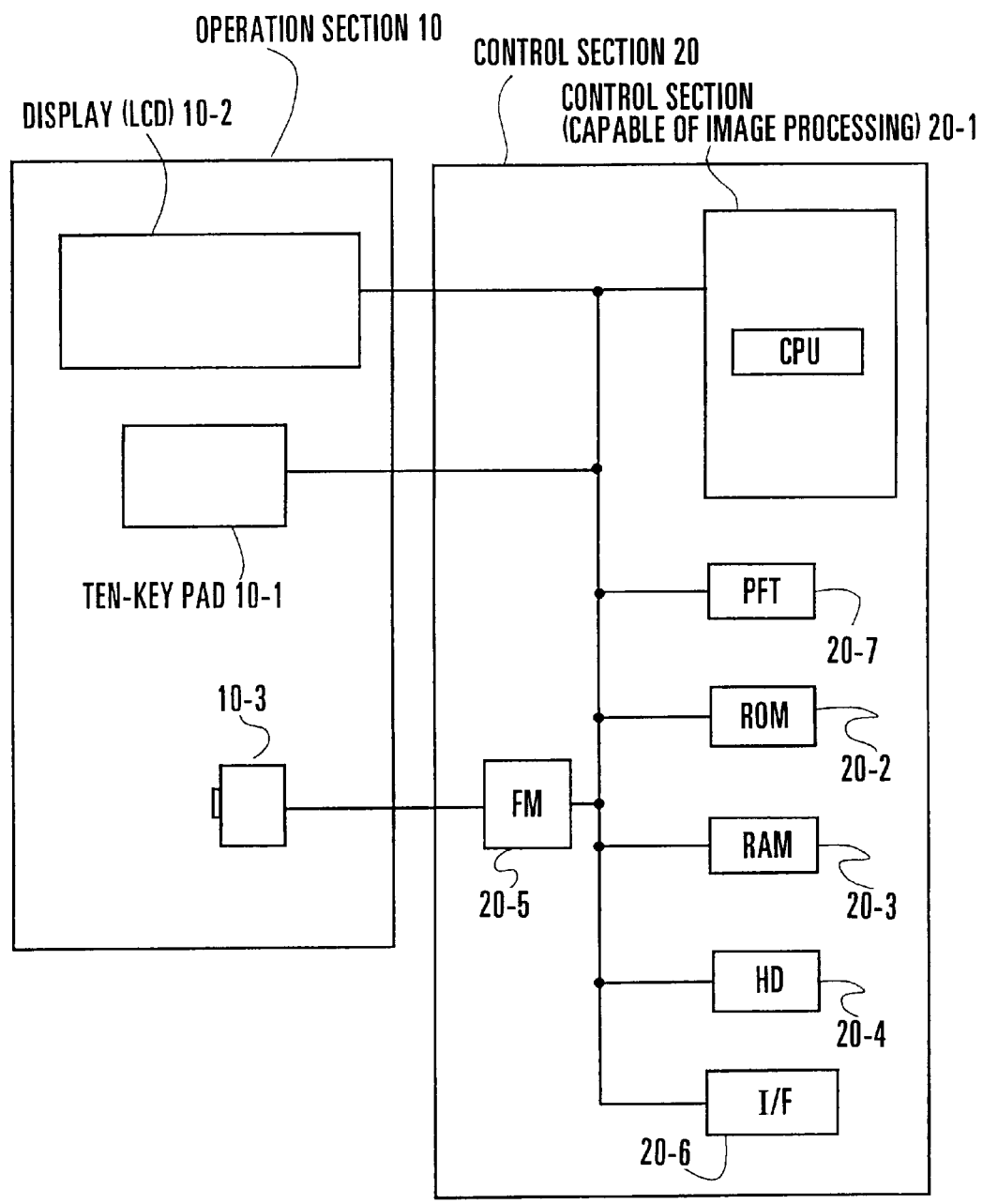
F I G. 2

PATTERN EXTRACTION APPARATUS

TECHNICAL FIELD

The present invention relates to a pattern extraction apparatus for extracting moving patterns and differences between registration and collation patterns by collating N-dimensional patterns (e.g., voice patterns (one-dimensional), plane image patterns (two-dimensional), and stereoscopic patterns (three-dimensional) on the basis of spatial frequency characteristics.

BACKGROUND ART

Conventionally, a difference between two similar patterns has been extracted by a human visual check. More specifically, one of the patterns is set as a reference pattern, and the reference pattern and the other pattern are compared through the human eye, thereby extracting a difference.

In addition, common patterns (moving patterns) that are present at different positions in two similar patterns (overall patterns) are also extracted by a human visual check. More specifically, one of the patterns is set as a reference pattern, and the reference pattern and the other pattern are compared through the human eye, thereby extracting moving patterns.

A human visual check, however, can cope with only a case wherein a difference or moving pattern between two similar pattern is clear. That is, if overall patterns are complicated or a difference or moving pattern is small, it takes time to extract it, and an accurate check cannot be made. If a plurality of moving patterns are present, it is difficult to detect all the moving patterns.

It is an object of the present invention to provide a pattern extraction apparatus which can accurately extract a difference and moving pattern between similar patterns in a short period of time.

DISCLOSURE OF INVENTION

According to the present invention, registration Fourier N-dimensional pattern data is generated by performing N-dimensional discrete Fourier transform for N-dimensional pattern data of a registration pattern, collation Fourier N-dimensional pattern data is generated by performing N-dimensional discrete Fourier transform for N-dimensional pattern data of a collation pattern, one of the N-dimensional discrete Fourier transform and N-dimensional inverse discrete Fourier transform is performed in a first pattern processing means for synthesized Fourier N-dimensional pattern data obtained by synthesizing the registration Fourier N-dimensional pattern data and the collation Fourier N-dimensional pattern data, a correlation peak in a correlation component area appearing in the synthesized Fourier N-dimensional pattern data for which the Fourier transform has been performed is obtained, a portion around the obtained correlation peak is masked, the N-dimensional inverse discrete Fourier transform is performed for the synthesized Fourier N-dimensional pattern data in which the portion is masked when the N-dimensional discrete Fourier transform is performed in the first pattern processing means, the N-dimensional discrete Fourier transform is performed for the pattern data when the N-dimensional inverse discrete Fourier transform is performed in the first pattern processing means, and the N-dimensional inverse discrete Fourier transform is performed for re-synthesized Fourier N-dimensional pattern data generated by re-synthesizing the synthesized Fourier N-dimensional pattern data for which the Fourier transform has been performed and the registration Fourier N-dimensional pattern data.

According to the present invention, registration Fourier N-dimensional pattern data is generated by performing N-dimensional discrete Fourier transform for N-dimensional pattern data of a registration pattern, and collation Fourier N-dimensional pattern data is generated by performing N-dimensional discrete Fourier transform for N-dimensional pattern data of a collation pattern. The N-dimensional discrete Fourier transform or N-dimensional inverse discrete Fourier transform is performed in the first pattern processing means for synthesized Fourier N-dimensional pattern data obtained by synthesizing the registration Fourier N-dimensional pattern data and the collation Fourier N-dimensional pattern data. A correlation peak in a correlation component area appearing in the synthesized Fourier N-dimensional pattern data for which the Fourier transform has been performed is obtained. A portion around the obtained correlation peak is masked. The N-dimensional inverse discrete Fourier transform is performed for the synthesized Fourier N-dimensional pattern data in which the portion is masked when the N-dimensional discrete Fourier transform is performed in the first pattern processing means. The N-dimensional discrete Fourier transform is performed for the pattern data when the N-dimensional inverse discrete Fourier transform is performed in the first pattern processing means. The N-dimensional inverse discrete Fourier transform is performed for re-synthesized Fourier N-dimensional pattern data generated by re-synthesizing the synthesized Fourier N-dimensional pattern data for which the Fourier transform has been performed and the registration Fourier N-dimensional pattern data. The contour of a difference or moving pattern is extracted from the re-synthesized Fourier N-dimensional pattern data having undergone the inverse discrete Fourier transform. The location of the difference or moving pattern can be known whatsoever.

According to the present invention, registration Fourier N-dimensional pattern data and collation Fourier N-dimensional pattern data are synthesized, and amplitude suppression processing (log processing, root processing, or the like) is performed for the resultant synthesized Fourier N-dimensional pattern data. One of the N-dimensional discrete Fourier transform or N-dimensional inverse discrete Fourier transform is performed for the data, and amplitude restoration processing (inverse function processing of log processing, root processing, or the like) is performed for the synthesized Fourier N-dimensional pattern data for which the Fourier transform has been performed by the second pattern processing means. The synthesized Fourier N-dimensional pattern data having undergone the amplitude restoration processing and the registration Fourier N-dimensional pattern data are re-synthesized. N-dimensional inverse discrete Fourier transform is performed for the resultant re-synthesized Fourier N-dimensional pattern data.

In addition, according to the present invention, registration Fourier N-dimensional pattern data and collation Fourier N-dimensional pattern data are synthesized, and amplitude suppression processing (log processing, root processing, or the like) is performed for the resultant synthesized Fourier N-dimensional pattern data. One of the N-dimensional discrete Fourier transform or N-dimensional inverse discrete Fourier transform is performed for the data. The synthesized Fourier N-dimensional pattern data for which the Fourier transform has been performed by the second pattern processing means and the registration Fourier N-dimensional pattern data are re-synthesized. N-dimensional inverse discrete Fourier transform is performed for the resultant re-synthesized Fourier N-dimensional pattern data.

Furthermore, according to the present invention, registration Fourier N-dimensional pattern data is generated by performing amplitude suppression processing (log processing, root processing, or the like) for the N-dimensional pattern data of a registration pattern after performing N-dimensional discrete Fourier transform is performed for the pattern data. Collation Fourier N-dimensional pattern data is generated by performing amplitude suppression processing (log processing, root processing, or the like) for the N-dimensional pattern data of a collation pattern after performing N-dimensional discrete Fourier transform for the pattern data. The synthesized Fourier N-dimensional pattern data for which the Fourier transform has been performed by the second pattern processing means and the registration Fourier N-dimensional pattern data are re-synthesized. The N-dimensional inverse discrete Fourier transform is performed for the resultant re-synthesized Fourier N-dimensional pattern data after amplitude restoration processing (inverse function processing of log processing, root processing, or the like) is performed for the pattern data.

Moreover, according to the present invention, registration Fourier N-dimensional pattern data is generated by performing amplitude suppression processing (log processing, root processing, or the like) for the N-dimensional pattern data of a registration pattern after performing N-dimensional inverse discrete Fourier transform is performed for the pattern data. Collation Fourier N-dimensional pattern data is generated by performing amplitude suppression processing (log processing, root processing, or the like) for the N-dimensional pattern data of a collation pattern after performing N-dimensional discrete Fourier transform for the pattern data. The synthesized Fourier N-dimensional pattern data for which the Fourier transform has been performed by the second pattern processing means and the registration Fourier N-dimensional pattern data are re-synthesized. The N-dimensional inverse discrete Fourier transform is performed for the resultant re-synthesized Fourier N-dimensional pattern data.

BRIEF DESCRIPTION OF DRAWINGS

FIG. 2 is a block diagram of the pattern extraction apparatus according to an embodiment of the present invention;

BEST MODE OF CARRYING OUT THE INVENTION

Figure 1B:
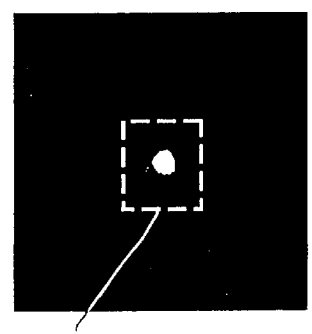
FIGS. 1A to 1G are views for explaining the steps in extracting a difference between a registration pattern and a collation pattern in a pattern extraction apparatus in FIG. 2.

The present invention will be described in detail below with reference to the present invention.

FIG. 2 is a block diagram showing a pattern extraction apparatus according to an embodiment of the present invention. FIG. 2 explains a case wherein two-dimensional pattern data consisting of image data are collated. Referring to FIG. 2, reference numeral 10 denotes an operation section; and 20, a control section. The operation section 10 includes a ten-key pad 10-1, a display (LCD: Liquid Crystal Display) 10-2 and a CCD (Charge Coupled Device) camera 10-3. The control section 20 is comprised of a control section 20-1 including a CPU (Central Processing Unit), a ROM (Read Only Memory) 20-2, a RAM (Random Access Memory) 20-3, a hard disk (HD) 20-4, a frame memory (FM) 20-5, an external connection section (I/F) 20-6, and a Fourier transform (FFT) section 20-7. A pattern extraction program is stored in the ROM 20-2.

[Registration of Reference Pattern]

Figure 3:
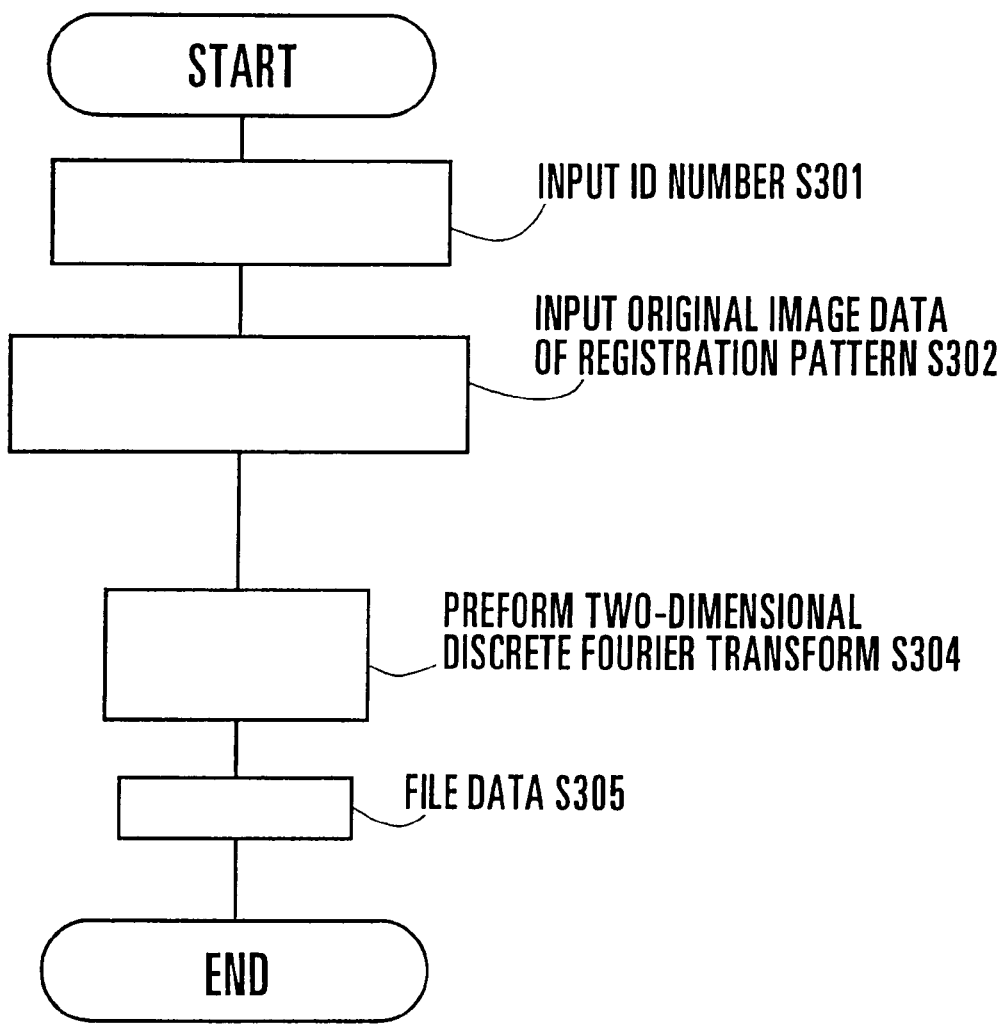
FIG. 3 is a flow chart for explaining reference (registration) pattern registration operation in the pattern extraction apparatus in FIG. 2.

In this pattern extraction apparatus, a reference pattern (registration pattern) is registered in the manner shown in FIG. 3. Before pattern collation, the user inputs the ID number assigned to the reference pattern with the ten-key pad 10-1 (step 301), and places the registration pattern at a predetermined position in the visual field range of the CCD camera 10-3. With this operation, the original image of the registration pattern is A/D-converted into a 256-level halftone image (image data: two-dimensional pattern data) constituted by 320×400 pixels. The resultant data is supplied to the control section 20.

Figure 1E:
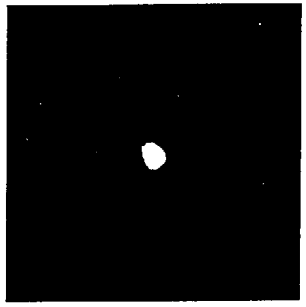

The control section 20-1 loads the registration pattern image data supplied from the operation section 10 through the frame memory 20-5 (step 302), and sends the loaded registration pattern image data (see FIG. 1A) to the Fourier transform section 20-7 to perform two-dimensional discrete Fourier transform (DFT) for the image data (step 304). With this operation, the registration pattern image data shown in FIG. 1A becomes Fourier image data (registration Fourier image data) FA shown in FIG. 1B. The control section 20-1 files this Fourier image data FA as the original image data of the registration pattern in correspondence with the ID number input to the hard disk 20-4 (step 305).

For example, the two-dimensional discrete Fourier transform is described in "Introduction to Computer Image Processing", edited by Nihon Kogyo Gijutu Center, pp. 44 to 45 (reference 1) and the like.

[Extraction of Difference]

Figure 4:
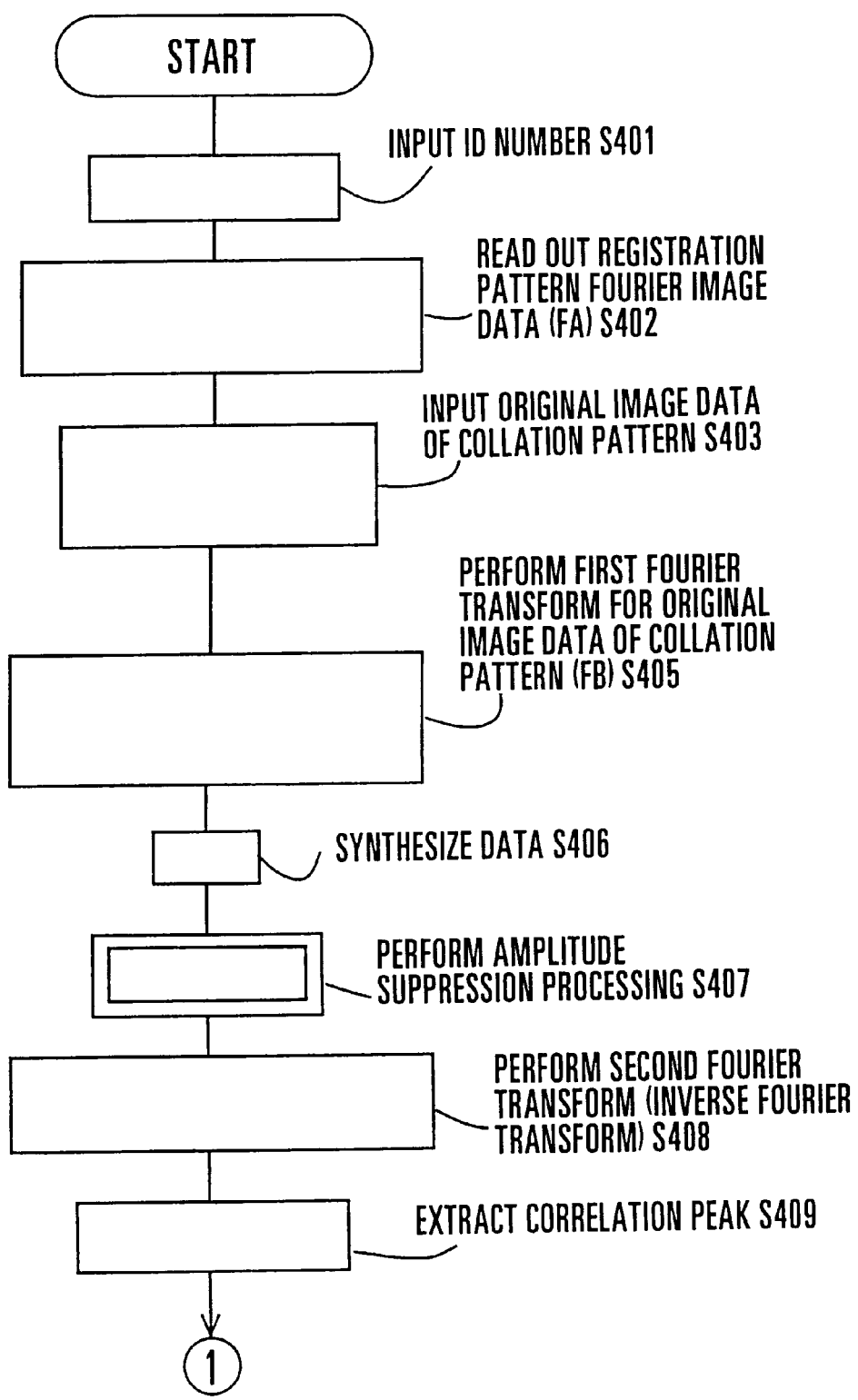
FIG. 4 is a flow chart for explaining extraction of the difference between the registration pattern and the collation pattern in the pattern extraction apparatus in FIG. 2.

In this pattern extraction apparatus, a difference between a registration pattern and a collation pattern is extracted in the manner shown in FIG. 4. The user uses the ten-key pad 10-1 to input the ID number assigned to a reference pattern (step 401), and places the collation pattern at a predetermined position in the visual field range of the ten-key pad 10-1. With this operation, as in the case with the registration pattern, the original image data of the collation pattern is supplied as 320×400-pixel, 256-level halftone image (image data: two-dimensional pattern data) to the control section 20.

Upon reception of the ID number through the ten-key pad 10-1, the control section 20-1 reads out the registration pattern Fourier image data FA corresponding to the ID number from the registration patterns filed in the hard disk 20-4 (step 402). The control section 20-1 loads the collation pattern image data supplied from the operation section 10 through the frame memory 20-5 (step 403), and sends the loaded collation pattern image data (see FIG. 1C) to the Fourier transform section 20-7 to perform two-dimensional discrete Fourier transform (two-dimensional DFT) for the collation pattern image data (step 405). With this operation, the collation pattern image data shown in FIG. 1C becomes Fourier image data (collation Fourier image data) FB shown in FIG. 1D.

The control section 20-1 synthesizes the collation pattern Fourier image data obtained in step 405 with the registration pattern Fourier image data read out in step 402 to obtain synthesized Fourier image data (step S406).

Letting $A \cdot e^{j\theta}$ be the collation Fourier image data, and $B \cdot e^{j\phi}$ be the registration Fourier image data, this synthesized Fourier image data is represented by $A \cdot B \cdot e^{j(\theta-\phi)}$. Note that A, B, θ, and φ are the functions of a frequency (Fourier) space (u, v).

$A \cdot B \cdot e^{j(\theta-\phi)}$ is rewritten as $$A \cdot B \cdot e^{j(\theta-\phi)} = A \cdot B \cdot \cos(\theta-\phi) + j \cdot A \cdot B \cdot \sin(\theta-\phi) \quad (1)$$

If $A \cdot e^{j\theta} = \alpha_1 + j\beta_1$ and $B \cdot e^{j\phi} = \alpha_2 + j\beta_2$, then $A = (\alpha_1^2 + \beta_1^2)^{1/2}$ $B = (\alpha_2^2 + \beta_2^2)^{1/2}$ $\theta = \tan^{-1}(\beta_1/\alpha_1)$ $\phi = \tan^{-1}(\beta_2/\alpha_2)$ By calculating equation (1), synthesized Fourier image data is obtained.

Note that synthesized Fourier image data may be obtained by equation (2):

$$\begin{aligned}A \cdot B \cdot e^j(\theta - \phi) &= A \cdot B \cdot e^{j\theta} \cdot e^{-j\phi} \\ &= A \cdot e^{j\theta} \cdot B \cdot e^{-j\phi} \\ &= (\alpha_1 + j\beta_1) \cdot (\alpha_2 - j\beta_2) \\ &= (\alpha_1 \cdot \alpha_2 + \beta_1 \cdot \beta_2) + \\ & \quad j(\alpha_2 \cdot \beta_1 - \alpha_1 \cdot \beta_2).\end{aligned} \quad (2)$$

After the synthesized Fourier image data is obtained in this manner, the control section 20-1 performs amplitude suppression processing for the image data by using phase only correlation (step 407). In this embodiment, log processing is performed as amplitude suppression processing. More specifically, the log of $A \cdot B \cdot e^{j(\theta-\phi)}$, which is the mathematical expression of the above synthesized Fourier image data, is calculated as $\log(A \cdot B) \cdot e^{j(\theta-\phi)}$, thereby suppressing $A \cdot B$ representing the amplitude to $\log(A \cdot B)$ ($A \cdot B > \log(A \cdot B)$). The above phase only correlation is cross correlation that is used for correction in consideration of the spatial phase change of an image. The amplitude information is suppressed by this method to obtain synthesized Fourier image data limited to only the phase information.

The synthesized Fourier image data having undergone amplitude suppression processing is less susceptible to the illuminance difference between the case in which the registration pattern is obtained and the case in which the collation pattern is obtained. That is, by performing amplitude suppression processing, the spectrum intensity of each pixel is suppressed to cut extreme values. As a result, more information is made effective.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 407, the control section 20-1 sends the synthesized Fourier image data having undergone the amplitude suppression processing to the Fourier transform section 20-7 to perform the second two-dimensional DFT (step 408). With this operation, the synthesized Fourier image data having undergone the amplitude suppression processing becomes synthesized Fourier image data like the one shown in FIG. 1E.

The control section 20-1 loads the synthesized Fourier image data obtained in step S408, and scans the intensities (amplitudes) of the correlation components of the respective pixels in a predetermined correlation component area including a central portion from this synthesized Fourier image data to obtain the histogram of the intensities of the correlation components of the respective pixels. The control section 20-1 then extracts a pixel having the highest intensity (correlation peak) in the correlation component area from this histogram (step S409). In this case, the correlation peak appears near the center of the correlation component area.

Figure 1F:
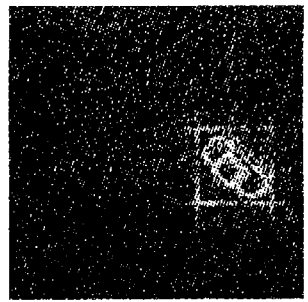
Figure 1D:
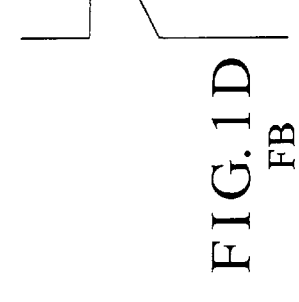
Figure 1A:
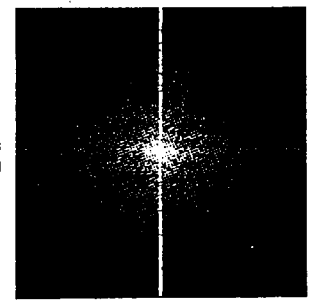
Figure 1C:

The control section 20-1 masks a portion around the correlation peak extracted in step S409 (step S410). More specifically, as shown in FIG. 1F, the control section 20-1 masks an area S0 enclosed with a white dotted line on the synthesized Fourier image data shown in FIG. 1E. The two-dimensional inverse discrete Fourier transform (two-dimensional IDFT) is performed for the synthesized Fourier image data having the area S0 masked (step S411), and amplitude restoration processing is performed for the synthesized Fourier image data having undergone the two-dimensional IDFT (step S412). In this case, in the amplitude restoration processing, the inverse function of the function executed in the amplitude suppression processing in step S407 is performed for the amplitude. $A^2$ is set for $\sqrt{A}$; and $e^A$, for $\log_e A$.

Figure 1G:

The control section 20-1 re-synthesizes the synthesized Fourier image data having undergone the amplitude restoration processing in step S412 and the registration Fourier image data FA read out in step S402 (step S413), and performs the two-dimensional IDFT for the resultant re-synthesized Fourier image data (step S414), thereby obtaining re-synthesized Fourier image data like the one shown in FIG. 1G.

To perform re-synthesis in step S413 is to extract a collation pattern A from the pattern obtained by synthesizing a registration pattern B and the collation pattern A. More specifically, re-synthesis can be performed in the following two ways. These two ways are equivalent to each other.

① If the synthesis in step S406 is expressed by $A \cdot B \cdot e^{j(\theta-\phi)}$, the re-synthesis in step S413 is represented by $(A \cdot B)/B \cdot e^{j((\theta-\phi)+\phi)} = A \cdot e^{j\theta}$.

② If the synthesis in step S406 is expressed by $A \cdot B \cdot e^{j(\phi-\theta)}$, the re-synthesis in step S413 is represented by $(A \cdot B)/B \cdot e^{j((\phi-(\theta-\phi)))} = A \cdot e^{j\theta}$.

As is obvious from FIG. 1G, in the re-synthesized Fourier image data having undergone this two-dimensional IDFT, the contour of the pattern that is present in only the collation pattern appears at the corresponding position. More specifically, in the collation pattern shown in FIG. 1C, a car pattern is superimposed on a portion. In FIG. 1G, this car pattern appears as a difference between the collation pattern and the registration pattern. The control section 20-1 extracts the car pattern appearing in FIG. 1G as a pattern that is present in only the collation pattern (step S415).

[Extraction of Moving Pattern]

In the above case of extraction of the difference between the registration pattern and the collation pattern, the car pattern is superimposed on only the collation pattern but no car pattern is superimposed on the registration pattern. In contrast to this, assume that a car pattern is superimposed on both a registration pattern and a collation pattern, and the position of this car pattern is moving.

Figure 5:
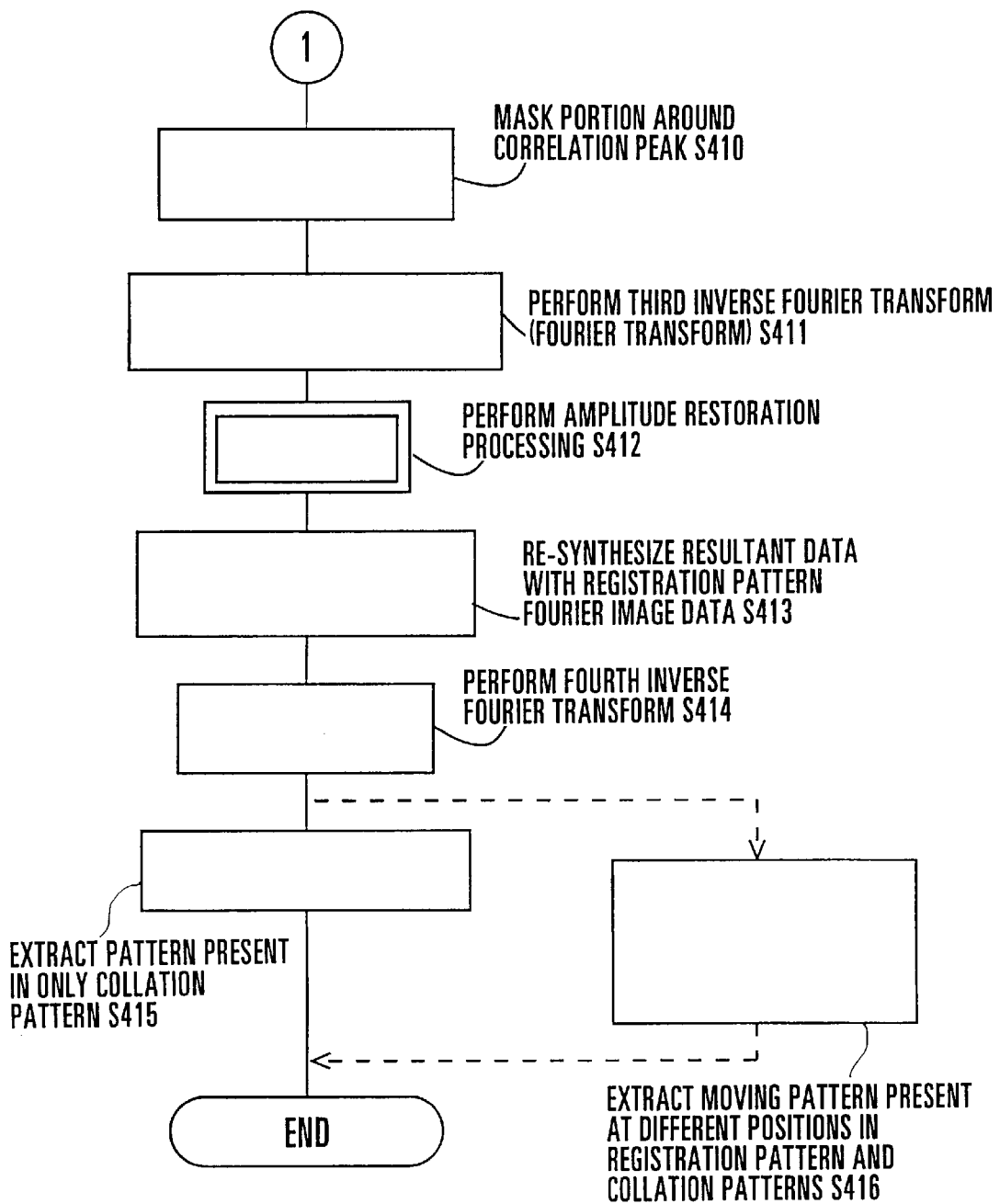
FIG. 5 is a flow chart for explaining extraction of the difference between the registration pattern and the collation pattern, following the flow chart of FIG. 4.
Figure 6:
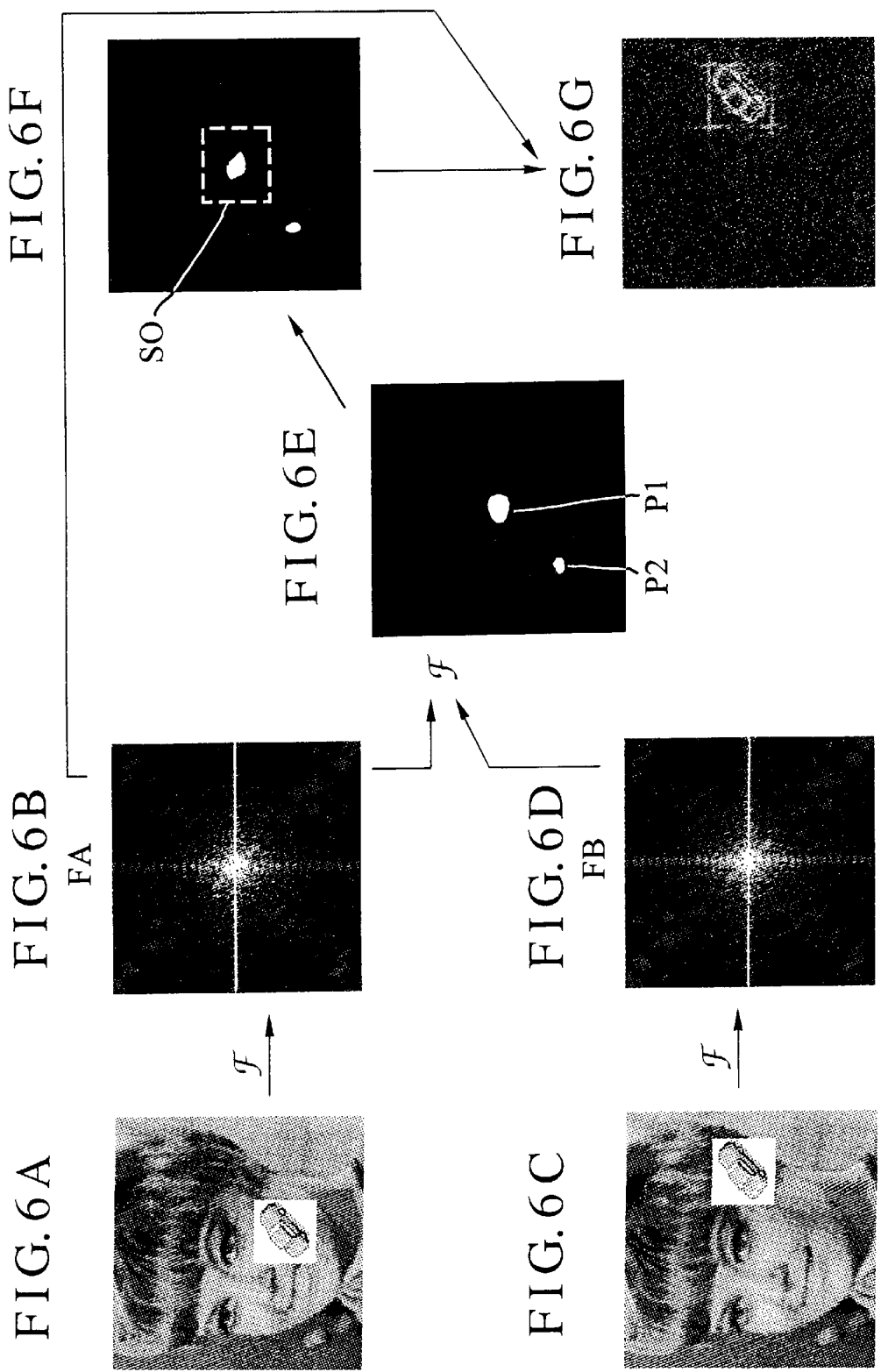
FIGS. 6A to 6G are views for explaining the steps in extracting a moving pattern in the pattern extraction apparatus in FIG. 2.

In this case as well, the control section 20-1 performs processing similar to that shown in the flow charts of FIGS. 4 and 5, and extracts a moving pattern through the steps shown in FIG. 6. In this case, a correlation value P1 representing a background and a correlation value P2 representing a car appear in FIG. 6E showing the step corresponding to that shown in FIG. 1E. In this case, the correlation value P1 is larger and extracted as a correlation peak, and hence a portion around the correlation value P1 is masked (see FIG. 6F).

The control section 20-1 performs the two-dimensional IDFT for the masked synthesized Fourier image data (step S411), and performs amplitude restoration processing for the synthesized Fourier image data having undergone the two-dimensional IDFT (step S412). The control section 20-1 then re-synthesizes the synthesized Fourier image data having undergone this amplitude restoration processing and the registration Fourier image data FA read out in step S402 (step S413), and performs the two-dimensional IDFT for the resultant re-synthesized Fourier image data (step S414), thereby obtaining re-synthesized Fourier image data like the one shown in FIG. 6G.

As is obvious from FIG. 6G, in the re-synthesized Fourier image data having undergone the two-dimensional IDFT, the contour of the moving pattern that is present in both the registration pattern and the collation pattern appears at the position corresponding to that in the collation pattern. That is, in the collation pattern in FIG. 6C, the position of the car in the registration pattern in FIG. 6A has moved. In FIG. 6G, this car pattern appears as a moving pattern that is present at different positions in the collation pattern and the registration pattern. The control section 20-1 extracts the car pattern appearing in FIG. 6G as a moving pattern that is present at different positions in the registration pattern and the collation pattern (step S416).

In this embodiment, the two-dimensional IDFT is performed by the Fourier transform section 20-7. However, this processing may be performed in the CPU 20-1. In addition, in this embodiment, the two-dimensional DFT is performed in step S408 in FIG. 4. However, the two-dimensional IDFT may be performed instead of the two-dimensional DFT. That is, the two-dimensional IDFT may be performed for synthesized Fourier image data having undergone amplitude suppression processing instead of two-dimensional DFT. If, however, the two-dimensional IDFT is performed in step S408, the two-dimensional DFT is performed in step S411. Quantitatively, no change in collation precision occurs whether two-dimensional discrete Fourier transform or two-dimensional discrete inverse Fourier transform is performed. The two-dimensional IDFT is described in reference 1.

Figure 7:
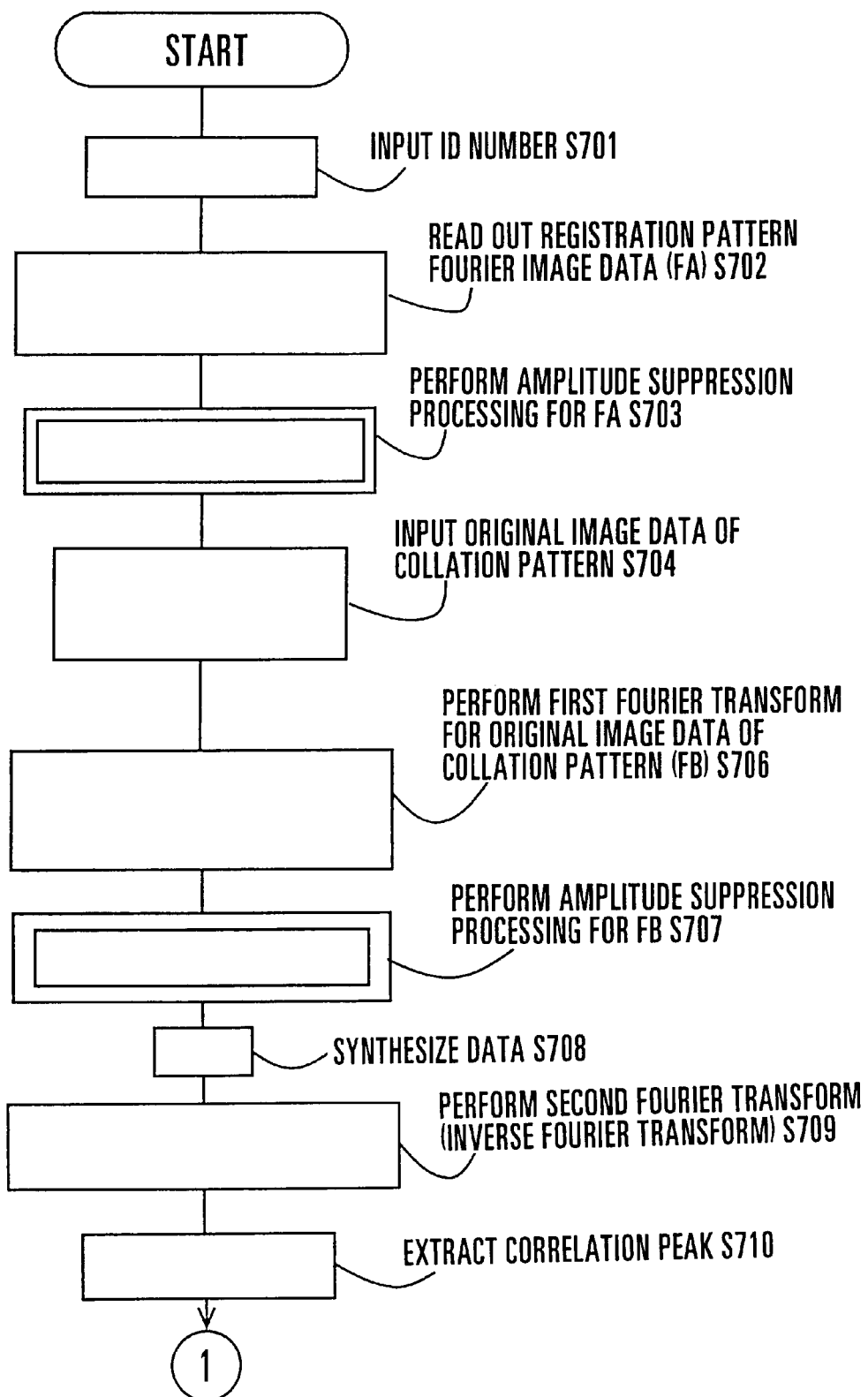
FIG. 7 is a flow chart for explaining moving pattern extraction operation in the pattern extraction apparatus in FIG. 2.
Figure 8:
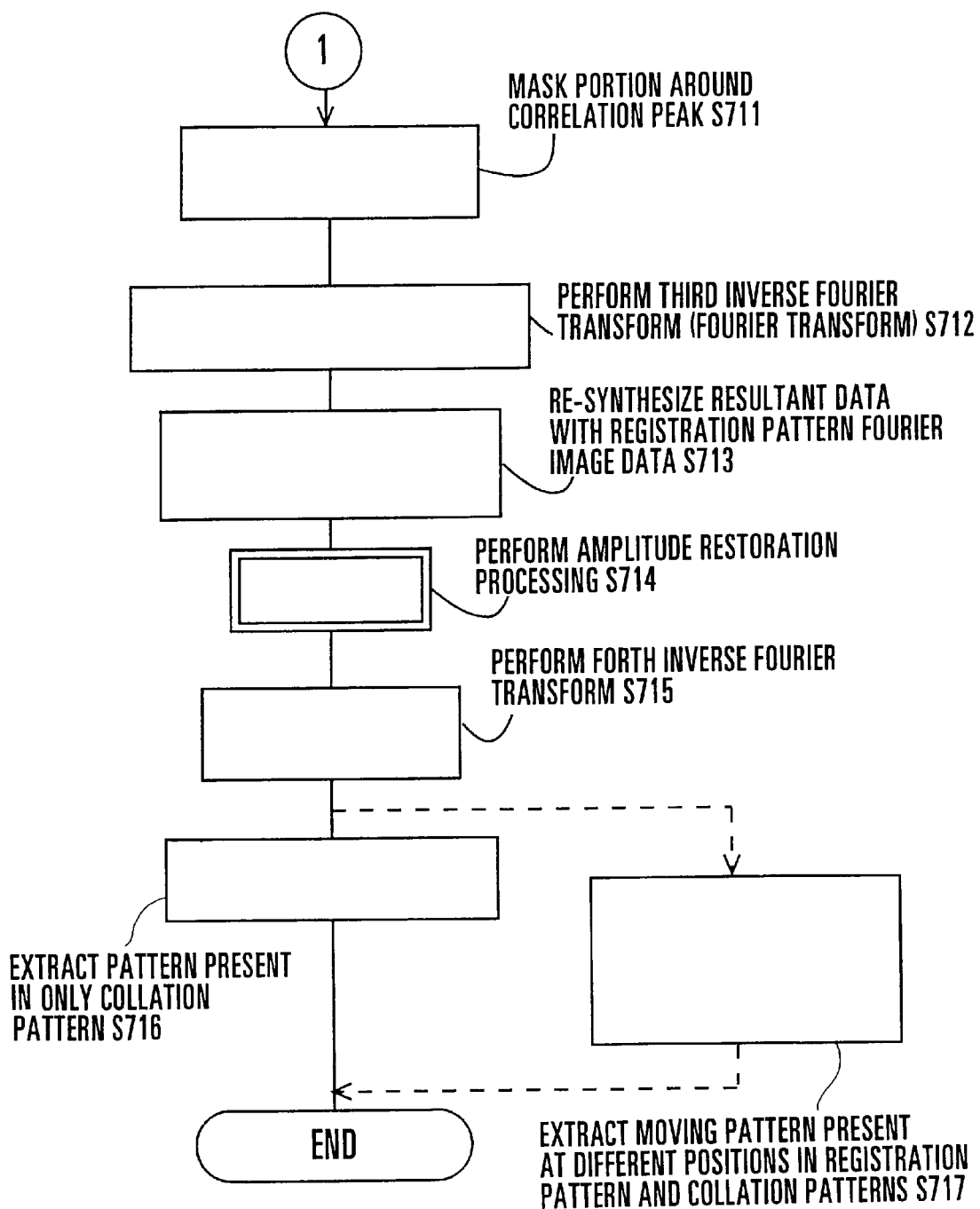
FIG. 8 is a flow chart for explaining the moving pattern extraction operation, following the flow chart of FIG. 7.

In this embodiment, amplitude suppression processing is performed first for synthesized Fourier image data, and the two-dimensional DFT is then performed in step S408. However, amplitude suppression processing may be performed for the registration Fourier image data FA and the collation Fourier image data FB before synthesis, and the resultant data may be synthesized. More specifically, as shown in FIG. 7, step S407 in FIG. 4 is omitted, and step S703 of performing amplitude suppression processing is set between step S702 of reading out the registration Fourier image data FA and step S704 of inputting the collation pattern image data. In addition, step S707 of performing amplitude suppression processing is set between step S706 of performing two-dimensional DFT for the collation pattern image data and step S708 of synthesizing the collation Fourier image data FB having undergone amplitude suppression processing and the registration Fourier image data FA. In this case, however, as shown in FIG. 8, step S714 of performing amplitude restoration processing is set after step S713 of re-synthesizing the synthesized Fourier image data having undergone the two-dimensional IDFT and the registration Fourier image data read out in step S702.

In this case, the registration Fourier image data and collation Fourier image data that have undergone amplitude suppression processing can be obtained by the amplitude suppression processing in steps S703 and S707, and the synthesized Fourier image data is obtained by synthesizing these Fourier image data. Note that steps S701, S709 to S712, and S717 to S717 are the same as steps S401, S409 to S412, and S417 to S417 in FIGS. 4 and 5, and a description thereof will be omitted.

The suppression ratio of the amplitude of the synthesized Fourier image data in this case is low as compared with the case shown in FIGS. 4 and 5 in which amplitude suppression processing is performed after synthesized Fourier image data is generated. Therefore, the method of performing amplitude suppression processing after synthesized Fourier image data is generated as shown in FIG. 4 is superior in collation precision to the method of generating synthesized Fourier image data after performing amplitude suppression processing as shown in FIG. 7. In the case shown in FIGS. 7 and 8 as well, in which synthesized Fourier image data is generated after amplitude suppression processing is performed, the two-dimensional IDFT may be performed for the synthesized Fourier image data instead of the two-dimensional DFT.

Furthermore, in the embodiment described above, two-dimensional pattern extraction processing has been described. However, three-dimensional pattern extraction processing can be performed in the same manner as described above, and extraction processing of multidimensional patterns, other than two- and three-dimensional patterns, can be performed in the same manner as described above. Furthermore, in the above embodiment, amplitude suppression processing is performed. However, amplitude suppression processing need not always be performed. If, for example, all amplitudes are set to 1 in amplitude suppression processing, i.e., phase only correlation is performed, amplitude restoration processing need not be performed.

Figure 9:
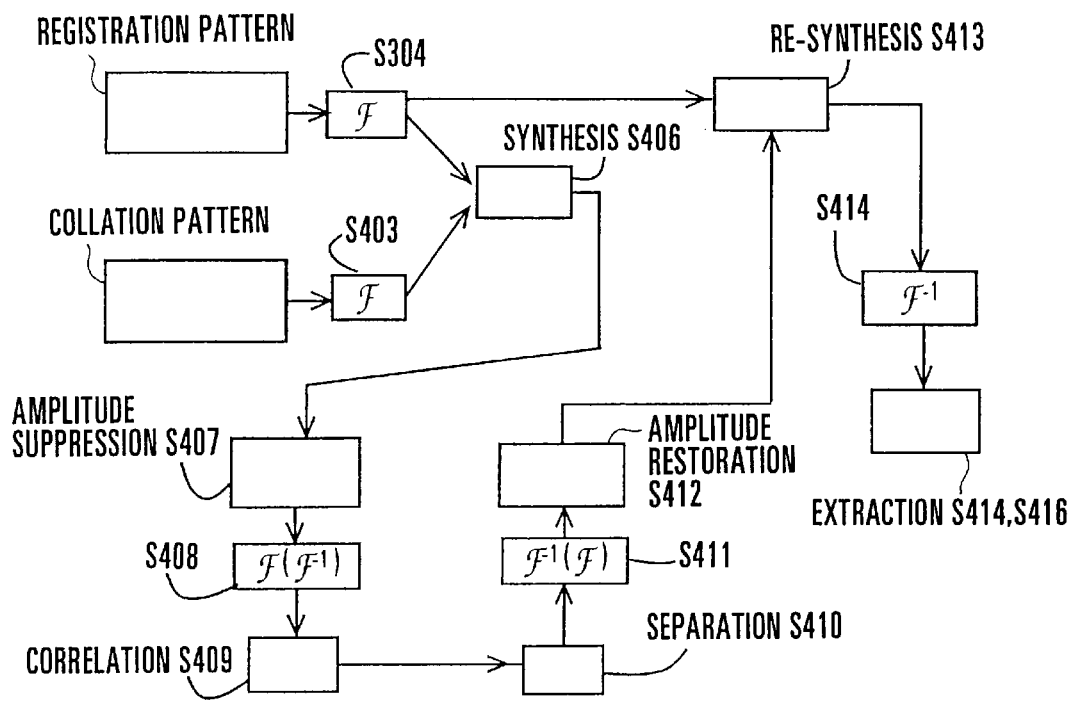
FIG. 9 is a functional block diagram of a pattern extraction algorithm corresponding to the flow charts of FIGS. 4 and 5.
Figure 10:
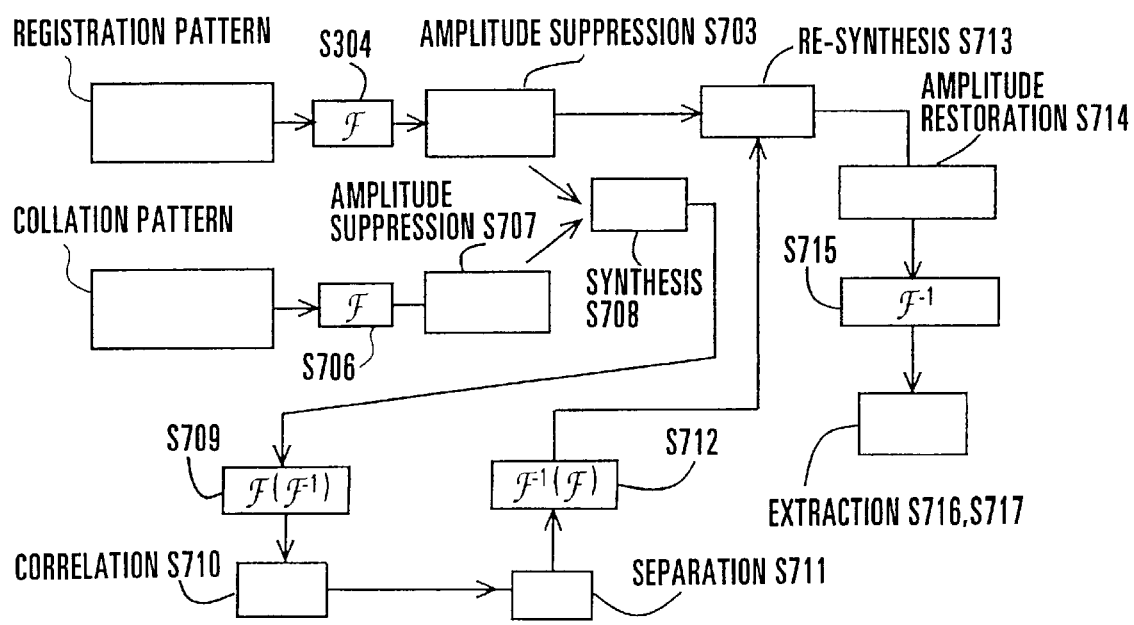
FIG. 10 is a functional block diagram of a pattern extraction algorithm corresponding to the flow charts of FIGS. 7 and 8.

FIG. 9 is a functional block diagram of a pattern extraction algorithm corresponding to the flow charts shown in FIGS. 4 and 5. FIG. 10 is a functional block diagram of a pattern extraction algorithm corresponding to the flow charts shown in FIGS. 7 and 8. Referring to FIGS. 9 and 10, the same step numbers as those in the flow charts are attached to the respective functional blocks, and the respective blocks have the functions of the steps corresponding to the attached step numbers.

As has been described above, according to the present invention, a registration pattern and a collation pattern are collated with each other on the basis of the spatial frequency characteristics, and a difference or moving pattern between the similar patterns can be extracted as the collation result. This allows accurate quality check, abnormality detection (analysis), and detection of a moving object within a short period of time.

What is claimed is:

1. A pattern extraction apparatus characterized by comprising:

registration Fourier pattern data generating means for generating registration Fourier N-dimensional pattern data by performing N-dimensional discrete Fourier transform for N-dimensional pattern data of a registration pattern;

collation Fourier pattern data generating means for generating collation Fourier N-dimensional pattern data by performing N-dimensional discrete Fourier transform for N-dimensional pattern data of a collation pattern;

first pattern processing means for performing one of the N-dimensional discrete Fourier transform and N-dimensional inverse discrete Fourier transform for synthesized Fourier N-dimensional pattern data obtained by synthesizing the registration Fourier N-dimensional pattern data generated by said registration Fourier pattern data generating means and the collation Fourier N-dimensional pattern data generated by said collation Fourier pattern data generating means;

mask processing means for obtaining a correlation peak in a correlation component area appearing in the synthesized Fourier N-dimensional pattern data for which the Fourier transform has been performed by said first pattern processing means, and masking a predetermined area including the obtained correlation peak;

second pattern processing means for performing the N-dimensional inverse discrete Fourier transform for the synthesized Fourier N-dimensional pattern data in which the predetermined area is masked by said mask processing means when the N-dimensional discrete Fourier transform is performed for the pattern data by said first pattern processing means, and performing the N-dimensional discrete Fourier transform for the pattern data when the N-dimensional inverse discrete Fourier transform is performed for the pattern data by said first pattern processing means; and third pattern processing means for performing the N-dimensional inverse discrete Fourier transform for re-synthesized Fourier N-dimensional pattern data generated by re-synthesizing the synthesized Fourier N-dimensional pattern data for which the Fourier transform has been performed by said second pattern processing means and the registration Fourier N-dimensional pattern data generated by said registration Fourier pattern data generating means.

2. A pattern extraction apparatus according to claim 1, characterized in that said first pattern processing means comprises:

pattern data synthesizing means for synthesizing the registration Fourier N-dimensional pattern data generated by said registration Fourier pattern data generating means and the collation Fourier N-dimensional pattern data generated by said collation Fourier pattern data generating means;

amplitude suppression processing means for performing amplitude suppression processing for the synthesized Fourier N-dimensional pattern data obtained by said pattern data synthesizing means; and first Fourier transform means for performing one of the N-dimensional discrete Fourier transform and the N-dimensional inverse discrete Fourier transform for the synthesized Fourier N-dimensional pattern data for which amplitude suppression has been performed by said amplitude suppression processing means, and said third pattern processing means comprises:

amplitude restoration processing means for performing amplitude restoration processing for the synthesized Fourier N-dimensional pattern data for which Fourier transform has been performed by said second pattern processing means;

pattern data re-synthesizing means for re-synthesizing the synthesized Fourier N-dimensional pattern data for which amplitude restoration has been performed by said amplitude suppression processing means and the registration Fourier N-dimensional pattern data generated by said registration Fourier pattern data; and second Fourier transform means for performing N-dimensional inverse discrete Fourier transform for the re-synthesized Fourier N-dimensional pattern data obtained by said pattern data re-synthesizing means.

3. A pattern extraction apparatus according to claim 1, characterized in that said first pattern processing means comprises:

pattern data synthesizing means for synthesizing the registration Fourier N-dimensional pattern data generated by said registration Fourier pattern data generating means and the collation Fourier N-dimensional pattern data generated by said collation Fourier pattern data generating means;

amplitude suppression processing means for performing amplitude suppression processing for the synthesized Fourier N-dimensional pattern data obtained by said pattern data synthesizing means; and first Fourier transform means for performing one of the N-dimensional discrete Fourier transform and the N-dimensional inverse discrete Fourier transform for the synthesized Fourier N-dimensional pattern data for which amplitude suppression has been performed by said amplitude suppression processing means, and said third pattern processing means comprises:

pattern data re-synthesizing means for re-synthesizing the synthesized Fourier N-dimensional pattern data for which the Fourier transform has been performed by said second pattern processing means and the registration Fourier N-dimensional pattern data generated by said registration Fourier pattern data generating means; and second Fourier transform means for performing N-dimensional inverse discrete Fourier transform for the re-synthesized Fourier N-dimensional pattern data obtained by said pattern data re-synthesizing means.

4. A pattern extraction apparatus according to claim 1, characterized in that said registration Fourier pattern data generating means comprises:

first Fourier transform means for performing N-dimensional discrete Fourier transform for N-dimensional pattern data of a registration pattern; and first amplitude suppression processing means for generating registration Fourier N-dimensional pattern data by performing amplitude suppression processing for the N-dimensional pattern data of the registration pattern for which the Fourier transform has been performed by said first Fourier transform means, said collation Fourier pattern data generating means comprises:

second Fourier transform means for performing N-dimensional discrete Fourier transform for the N-dimensional pattern data of the collation pattern; and second amplitude suppression processing means for generating collation Fourier N-dimensional pattern data by performing amplitude suppression processing for the N-dimensional pattern data of the collation pattern for which the Fourier transform has been performed by said second Fourier transform means, and said third pattern processing means comprises:

pattern data re-synthesizing means for re-synthesizing the synthesized Fourier N-dimensional pattern data for which the Fourier transform has been performed by said second pattern processing means and the registration Fourier N-dimensional pattern data generated by said registration Fourier pattern data generating means;

amplitude restoration processing means for performing amplitude restoration processing for the re-synthesized Fourier N-dimensional pattern data obtained by said pattern data re-synthesizing means; and third Fourier transform means for performing the N-dimensional inverse discrete Fourier transform for the re-synthesized Fourier N-dimensional pattern data for which amplitude restoration has been performed by said amplitude restoration processing means.

5. A pattern extraction apparatus according to claim 1, characterized in that said registration Fourier pattern data generating means comprises:

first Fourier transform means for performing N-dimensional discrete Fourier transform for N-dimensional pattern data of a registration pattern; and first amplitude suppression processing means for generating registration Fourier N-dimensional pattern data by performing amplitude suppression processing for the N-dimensional pattern data of the registration pattern for which the Fourier transform has been performed by said first Fourier transform means, said collation Fourier pattern data generating means comprises:

second Fourier transform means for performing N-dimensional discrete Fourier transform for the N-dimensional pattern data of the collation pattern; and second amplitude suppression processing means for generating collation Fourier N-dimensional pattern data by performing amplitude suppression processing for the N-dimensional pattern data of the collation pattern for which the Fourier transform has been performed by said second Fourier transform means, and said third pattern processing means comprises:

pattern data re-synthesizing means for re-synthesizing the synthesized Fourier N-dimensional pattern data for which the Fourier transform has been performed by said second pattern processing means and the registration Fourier N-dimensional pattern data generated by said registration Fourier pattern data generating means; and third Fourier transform means for performing the N-dimensional inverse discrete Fourier transform for the re-synthesized Fourier N-dimensional pattern data obtained by said pattern data re-synthesizing means.

6. A pattern extraction apparatus according to claim 1, characterized in that said mask processing means comprises:

correlation peak calculation means for obtaining a correlation peak in a correlation component area on the basis of a histogram of intensities of correlation components of the synthesized Fourier N-dimensional pattern data for which the Fourier transform has been performed by said first pattern processing means; and mask means for masking a predetermined area including the correlation peak obtained by said correlation peak calculation means.

7. A pattern extraction apparatus according to claim 1, characterized by further comprising pattern extraction means for extracting a different pattern that is present in only the collation pattern from the re-synthesized Fourier N-dimensional pattern data for which the inverse Fourier transform has been performed by said third pattern processing means.

8. A pattern extraction apparatus according to claim 1, characterized by further comprising pattern extraction means for extracting a moving pattern that is present at different positions in the collation pattern and the registration pattern from the re-synthesized Fourier N-dimensional pattern data for which the inverse Fourier transform has been performed by said third pattern processing means.

* * * * *